US012227941B2

(12) United States Patent
Lai

(10) Patent No.: US 12,227,941 B2
(45) Date of Patent: Feb. 18, 2025

(54) FOLDING DIVIDING SCREEN STRUCTURE

(71) Applicant: KADEYA ENTERPRISE CO., LTD, Puxin Township, Changhua County (TW)

(72) Inventor: Ting-Yu Lai, Puxin Township, Changhua County (TW)

(73) Assignee: KADEYA ENTERPRISE CO. , LTD, Changhua County (TW)

( * ) Notice: Subject to any disclaimer, the term of this patent is extended or adjusted under 35 U.S.C. 154(b) by 658 days.

(21) Appl. No.: 17/372,505

(22) Filed: Jul. 11, 2021

(65) Prior Publication Data

US 2023/0007891 A1 Jan. 12, 2023

(51) Int. Cl.
*E04B 2/74* (2006.01)
*E05D 3/12* (2006.01)

(52) U.S. Cl.
CPC .............. *E04B 2/7405* (2013.01); *E05D 3/12* (2013.01); *E05Y 2900/20* (2013.01)

(58) Field of Classification Search
CPC .... E04B 2/7405; E04B 2/7416; E04B 2/7425; E04B 2/7427; E04B 2/7429; E04B 2/7431; E05D 3/12; E05D 7/02; E05D 7/009; A47G 5/00; E06B 3/481
USPC ........................................ 160/351, 352, 353
See application file for complete search history.

(56) References Cited

U.S. PATENT DOCUMENTS

| | | | | | |
|---|---|---|---|---|---|
| 255,809 | A * | 4/1882 | Pfauntz et al. | E05D 3/12 | 5/57.1 |
| 395,196 | A * | 12/1888 | Andrew | E05D 3/12 | 16/371 |
| 1,268,104 | A * | 6/1918 | Flick et al. | E05D 3/12 | 16/366 |
| 1,554,334 | A * | 9/1925 | Cranshaw | A47G 5/00 | 160/381 |
| 1,659,928 | A * | 2/1928 | Townsend | E05D 3/12 | 16/366 |
| 1,661,003 | A * | 2/1928 | Miller | A47G 5/00 | 160/381 |
| 2,162,523 | A * | 6/1939 | Blood | F24F 1/04 | 312/249.8 |
| 2,440,817 | A * | 5/1948 | Benson | E05D 3/12 | 16/302 |
| 3,889,315 | A * | 6/1975 | Stouffer | E06B 7/362 | 16/371 |
| 3,949,801 | A * | 4/1976 | Sasaki | E05D 1/04 | 16/75 |
| 4,194,313 | A * | 3/1980 | Downing | B29C 53/063 | 428/116 |
| 4,443,911 | A * | 4/1984 | Bannister | E04B 2/7431 | 52/239 |
| 4,569,143 | A * | 2/1986 | Bannister | E04B 2/7431 | 211/198 |
| 4,606,394 | A * | 8/1986 | Bannister | E04B 2/7416 | 52/239 |
| 4,765,027 | A * | 8/1988 | Andric | E05D 3/122 | 16/371 |

(Continued)

*Primary Examiner* — Johnnie A. Shablack

(57) ABSTRACT

A folding dividing screen structure has at least two screen panels, a plurality of sealing covers, at least one connecting member with a respective vertical through channel on opposite sides of the connecting member, and at least two vertical strips. Each screen panel is secured in an outer frame, the connecting member pivotally connected with the two screen panels via the two vertical strips.

10 Claims, 6 Drawing Sheets

(56) References Cited

U.S. PATENT DOCUMENTS

| | | | | | |
|---|---|---|---|---|---|
| 4,823,858 | A * | 4/1989 | Perutz | E05D 3/14 | 16/366 |
| 4,912,866 | A * | 4/1990 | Bannister | G09F 1/12 | 40/733 |
| 5,107,652 | A * | 4/1992 | Sosa | E04H 17/18 | 52/586.1 |
| 5,272,848 | A * | 12/1993 | Maas | A47G 5/00 | 160/135 |
| 5,278,725 | A * | 1/1994 | Konno | G06F 1/1616 | 439/165 |
| 5,287,909 | A * | 2/1994 | King | A47G 5/00 | 160/229.1 |
| 5,486,391 | A * | 1/1996 | Tyner | B32B 27/065 | 428/319.3 |
| 5,493,760 | A * | 2/1996 | Takimoto | E05D 3/12 | 16/376 |
| 6,009,930 | A * | 1/2000 | Jantschek | E04B 2/7431 | 160/352 |
| 6,574,837 | B2 * | 6/2003 | Jantschek | E05D 11/1014 | 292/DIG. 17 |
| 6,892,784 | B2 * | 5/2005 | Maas | A47G 5/00 | 52/239 |
| 6,971,197 | B1 * | 12/2005 | Seiber | H05K 5/0204 | 40/606.15 |
| 7,908,711 | B2 * | 3/2011 | Johnson | A47G 25/06 | 16/369 |
| 8,312,596 | B2 * | 11/2012 | Self | A47K 3/36 | 16/354 |
| 9,187,940 | B2 * | 11/2015 | Chandler | E05D 3/08 | |
| 9,213,366 | B2 * | 12/2015 | Lai | G06F 1/162 | |
| 9,297,190 | B2 * | 3/2016 | Lee | E05D 7/009 | |
| 10,920,471 | B2 * | 2/2021 | Hall | E05D 11/1014 | |
| 11,047,158 | B2 * | 6/2021 | Watanabe | E05D 15/26 | |
| 11,567,543 | B2 * | 1/2023 | Siddiqui | G06F 1/1618 | |
| 11,608,634 | B2 * | 3/2023 | Kuchman | E04B 2/7431 | |
| 2003/0221798 | A1 * | 12/2003 | Hunt | A47G 5/00 | 160/135 |
| 2006/0254176 | A1 * | 11/2006 | Tsai | E04B 2/7424 | 52/481.2 |
| 2007/0094846 | A1 * | 5/2007 | Ishida | E05D 3/122 | 16/354 |
| 2010/0024169 | A1 * | 2/2010 | Self | A47K 3/36 | 16/354 |
| 2013/0099643 | A1 * | 4/2013 | Kromrey | E05D 3/12 | 16/386 |
| 2013/0260362 | A1 * | 10/2013 | Melashenko | E04B 2/7431 | 434/430 |
| 2023/0007891 | A1 * | 1/2023 | Lai | E05D 7/009 | |

* cited by examiner

FOLDING DIVIDING SCREEN STRUCTURE

BACKGROUND OF INVENTION

Field of Invention

The present invention relates to a folding dividing screen structure.

Description of the Related Art

In order to isolate some private spaces in the home or workplace, screens are often used to replace the fixed partition walls. However, ordinary screens have problem of being unable to be folded and occupying a lot of space when not in use. Most of the conventional foldable screens have at least two screen panels, and each of the screen panels is pivoted respectively up and down by a butterfly hinge, so that the screen panel of the screen can be expanded into different ways through pivoting. The enclosed angle may be smoothly folded to greatly reduce its size.

However, the above-mentioned conventional structure still has the following problems in practical applications: the screen that directly employs the butterfly hinges creates a gap between every two adjacent screen panels. In the process of unfolding or folding the screen, if the user accidentally put their fingers into the gap, the fingers might be pinched by the screen panels of the screen.

Therefore, it is desirable to provide a folding dividing screen structure to mitigate and/or obviate the aforementioned problems.

SUMMARY OF THE INVENTION

An objective of present invention is to provide a folding dividing screen structure.

To achieve these and other objects of the present invention, the folding dividing screen structure has at least two screen panels, a plurality of sealing covers, at least one connecting member with a respective vertical through channel on opposite sides of the connecting member, and at least two vertical strips. Each screen panel is secured in an outer frame, the connecting member pivotally connected with the two screen panels via the two vertical strips.

Each outer frame has four edge strips connected by the sealing covers, each outer frame respectively having a vertical contacting surface formed by one of the edge strips and sealing covers at opposite ends of the one of the edge strips, the vertical contacting surface having a plurality of engaging members disposed along the one of the edge strips and the sealing covers at opposite ends of the one of the edge strips, each engaging member having a through aperture.

The connecting member is disposed between the two screen panels, each of the vertical strips is inserted through a through hole of a respective sealing cover, a respective one of the two through channels at opposite sides of the connecting member, and the through apertures of along a respective one of the edge strips; therefore the two screen panels ae respectively pivoted with two opposite sides of the connecting member, the connecting member further has a respective protruding end at opposite ends of the connecting member, and two engaging members respectively correspond to two opposite sides of at least one of the protruding ends.

Other objects, advantages, and novel features of invention will become more apparent from the following detailed description when taken in conjunction with the accompanying drawings.

DETAILED DESCRIPTION OF THE PREFERRED EMBODIMENT

Figure 1:
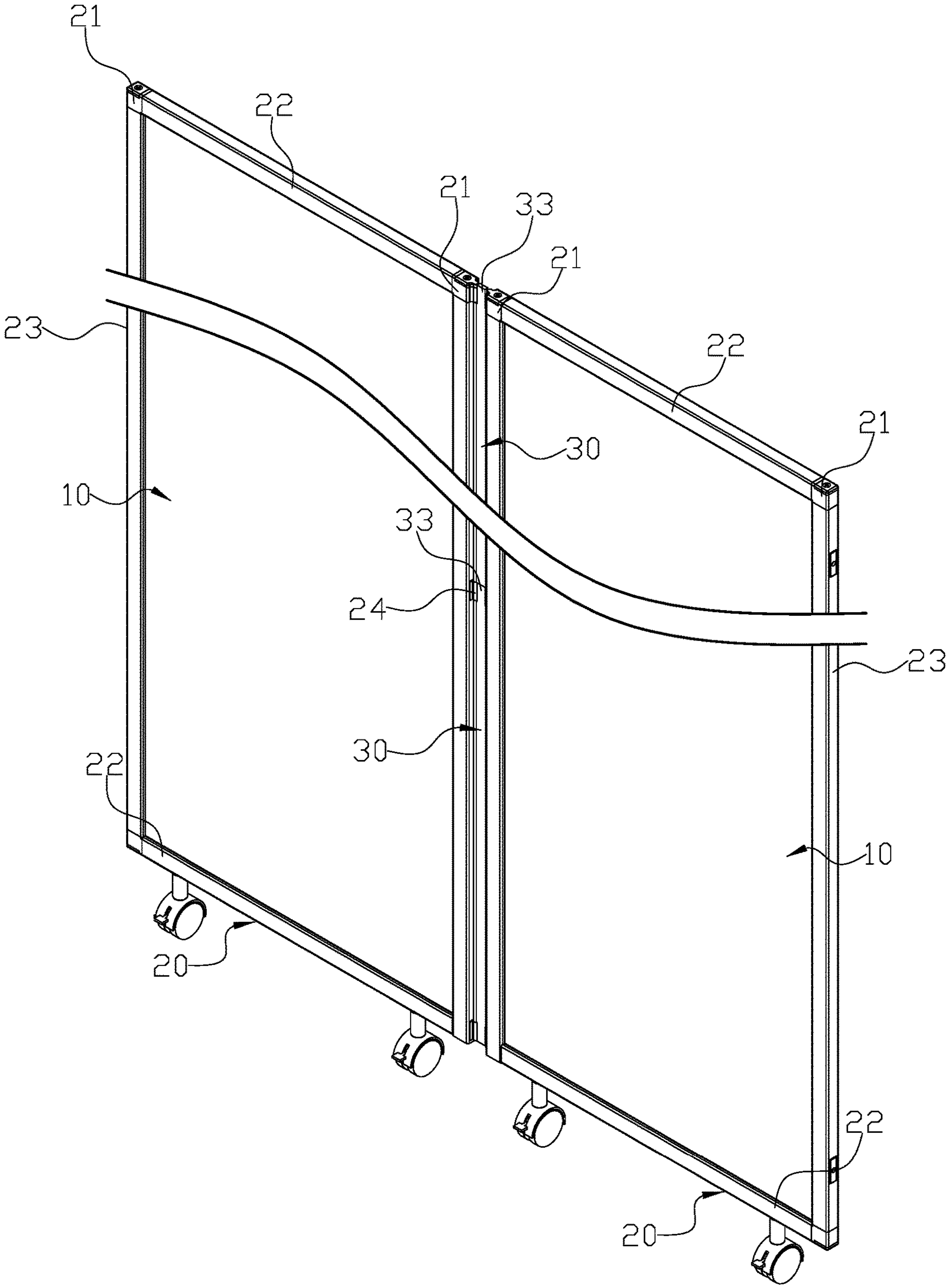
FIG. 1 is a three-dimensional combination drawing of a preferred embodiment according to the present invention.

First, please refer to FIGS. 1-4. A folding dividing screen structure comprising: at least two screen panels 10, a plurality of sealing covers 21, at least one connecting member 30 with a respective vertical through channel 31 on opposite sides of the connecting member 30, and at least two vertical strips 40. Each screen panel 10 is secured in an outer frame 20, and the connecting member 30 is pivotally connected with the two screen panels 10 via the two vertical strips 40. Each outer frame 20 has four edge strips 22 connected by the sealing covers 21, and each outer frame 20 respectively has a vertical contacting surface 23 formed by one of the edge strips 22 and the sealing covers 21 at opposite ends of the one of the edge strips 22. The vertical contacting surface 23 has a plurality of engaging members 24 disposed along the one of the edge strips 22 and the sealing covers 21 at opposite ends of the one of the edge strips 22, and each engaging member 24 has a through aperture 241. The connecting member 30 is disposed between the two screen panels 10, and each of the vertical strips 40 is inserted through a through hole 241 of a respective sealing cover 21, a respective one of the two through channels 31 at opposite sides of the connecting member and the through apertures 241 of a respective one of the edge strips 22. Therefore, after the two vertical strip 40 are inserted, the two screen panels 10 are respectively pivoted with two opposite sides of the connecting member 30. The connecting member 30 further has a respective protruding end 33 at opposite ends of the connecting member 30, and two engaging members 24 respectively correspond to two opposite sides 32 of at least one of the protruding ends 33.

Moreover, each screen panel 10 comprises two vertical contacting surfaces 23, wherein only one of the two vertical contacting surfaces 23 of each screen panel 10 has the engaging members 24 as shown in FIGS. 1-5.

Figure 6:
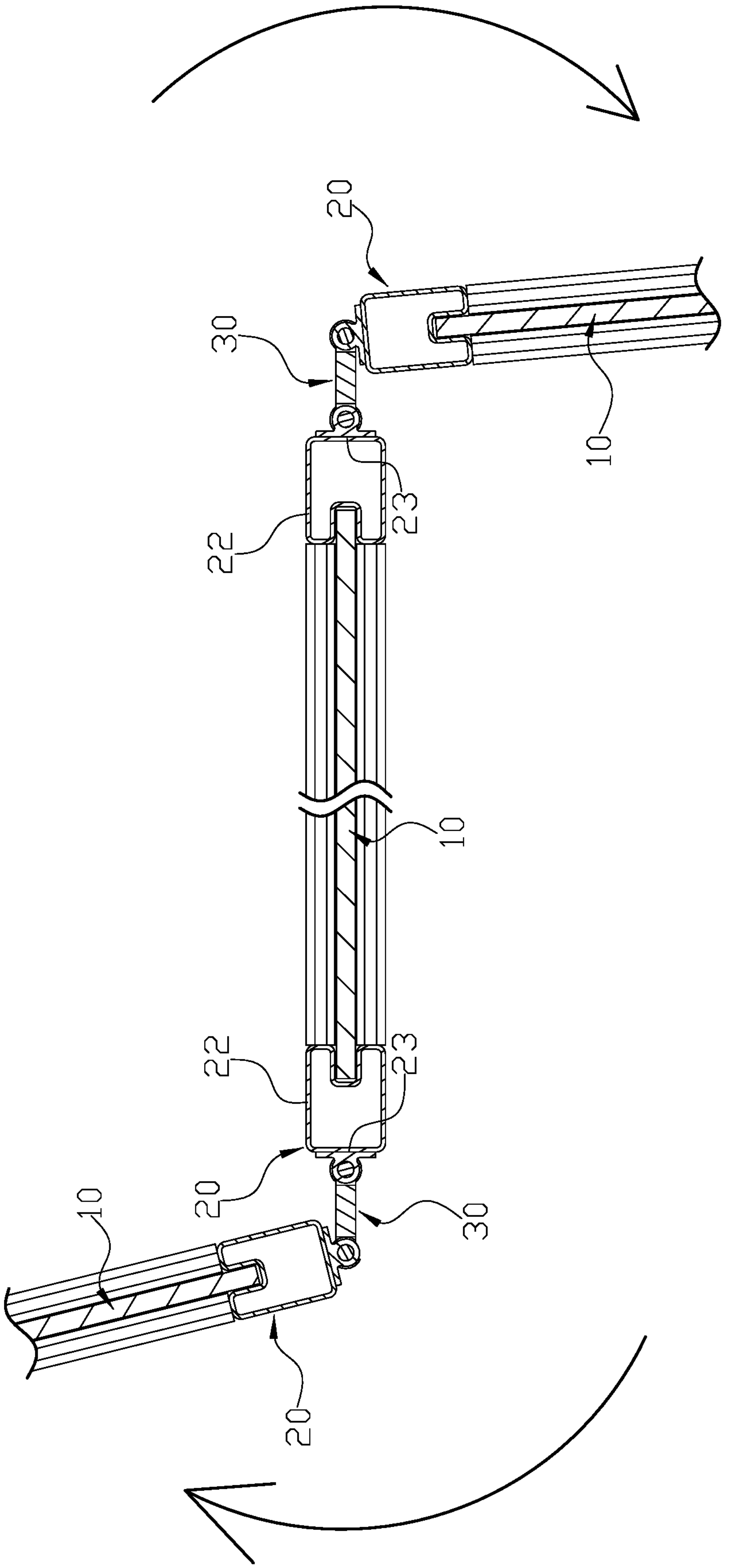
FIG. 6 is an action diagram showing different folded angle of the preferred embodiment according to the present invention.
Figure 7:
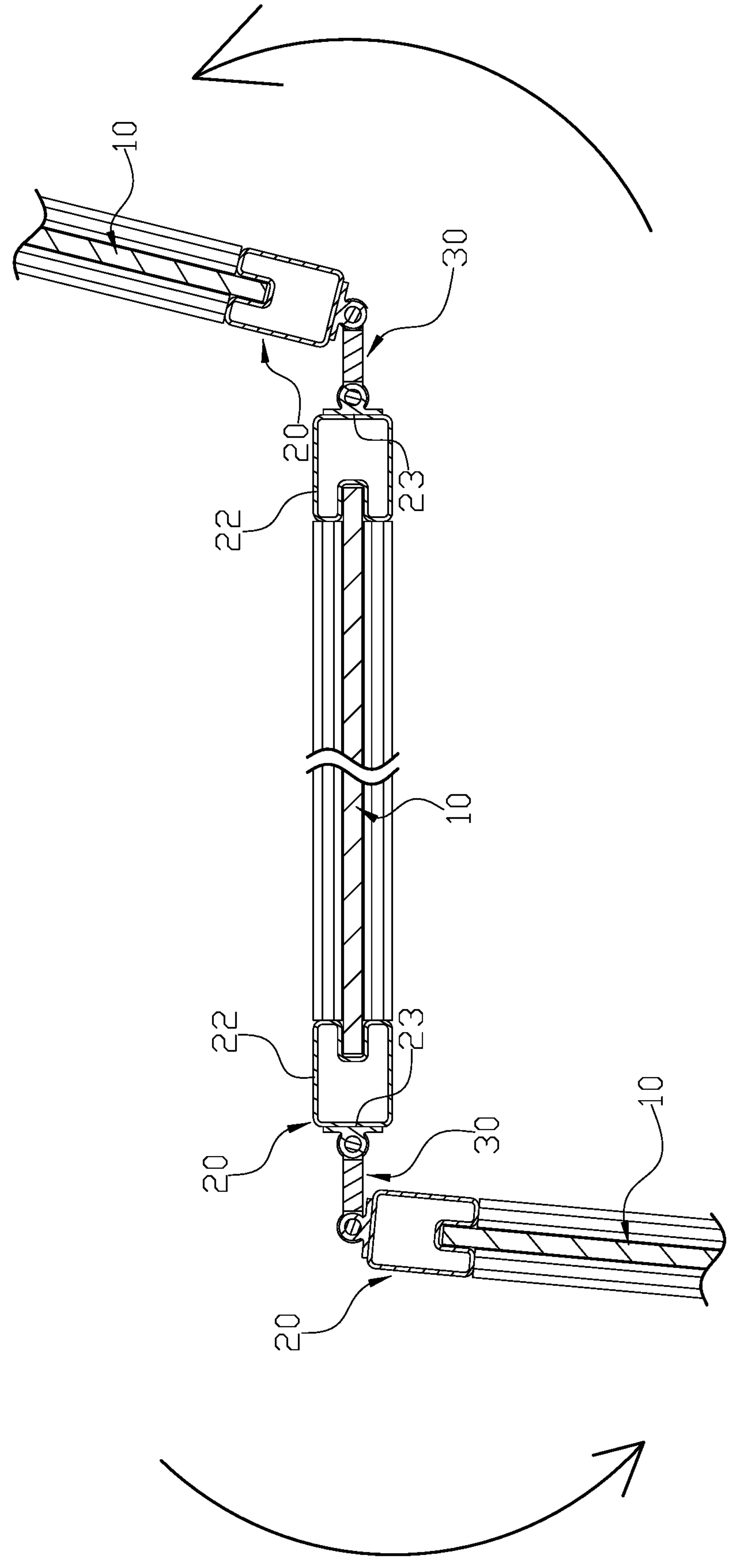
FIG. 7 is another action diagram showing different folded angle in another direction of the preferred embodiment according to the present invention.

Furthermore, both of the two vertical contacting surfaces 23 of the at least one of the screen panels 10 has the engaging members 24, and the at least one of the screen panels is pivoted with another screen panel at each opposite side, as shown in FIG. 6 and FIG. 7.

Figure 2:
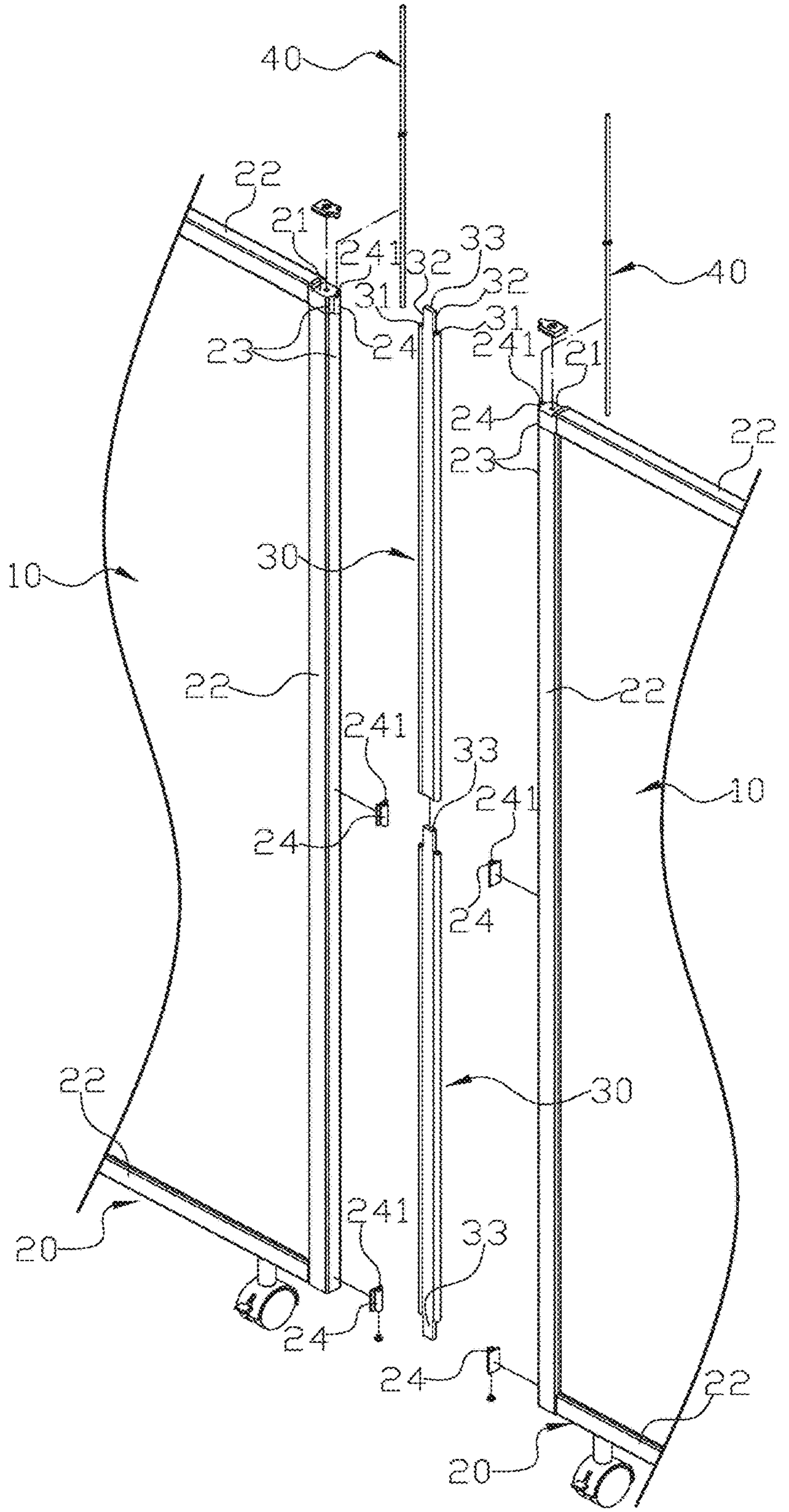
FIG. 2 is a three-dimensional exploded view of the preferred embodiment according to the present invention.
Figure 3:
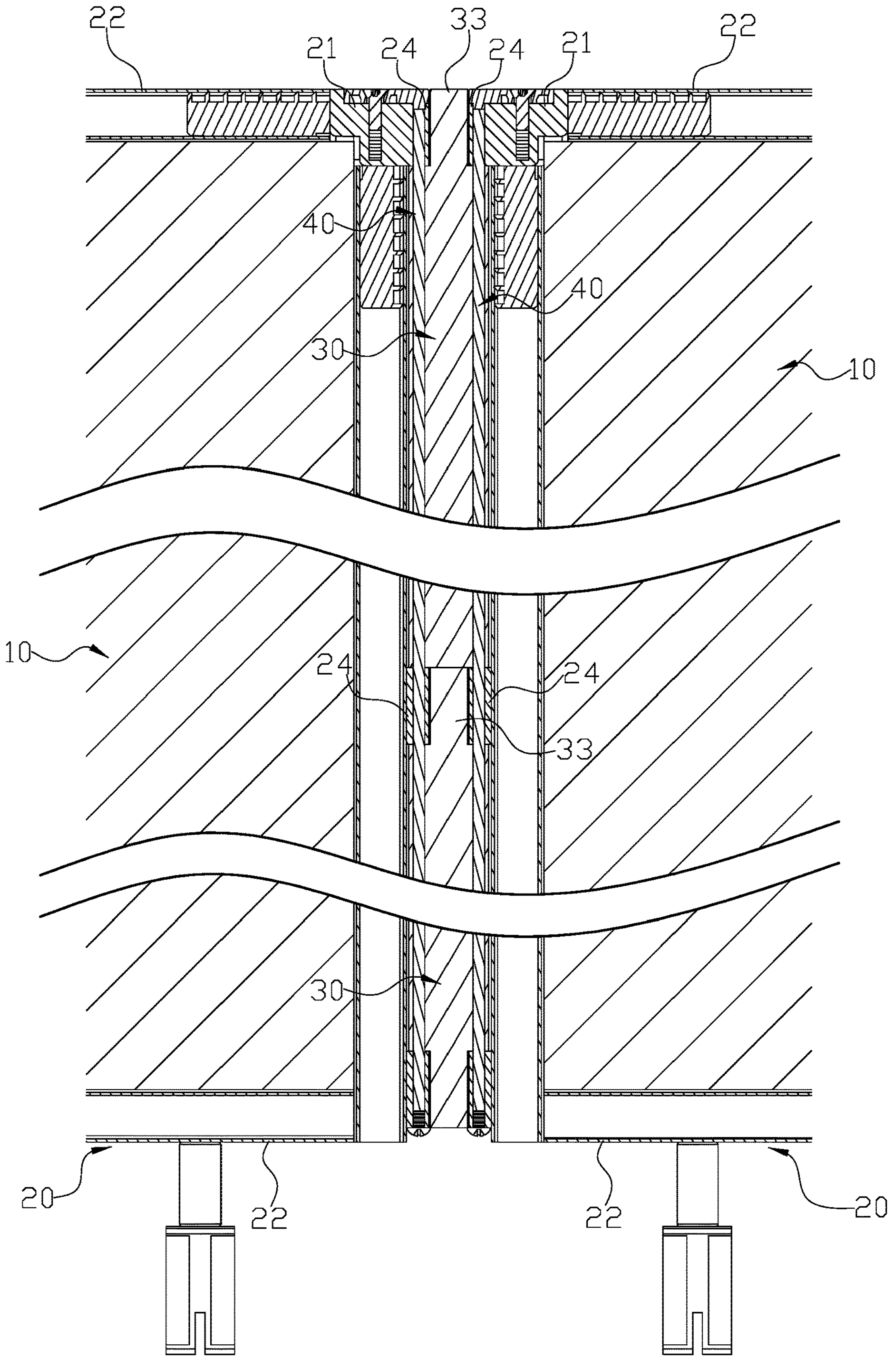
FIG. 3 is a sectional view of the composition of the preferred embodiment according to the present invention.

In addition, wherein the sealing covers 21 are employed at a top corner of each outer frame 20, as shown in FIG. 1 and FIG. 2.

Both a top corner and a bottom corner of each outer frame 20 employ sealing covers 21 for connecting the edge strips 22.

Also, the each sealing cover 21 is integrally made with a respective engaging member 24.

Moreover, each engaging member 14 disposed on a sealing cover 22 is installed on the sealing cover 22.

In addition, a lower part of the outer frame 20 is combined with at least one pulley for easy movement.

Furthermore, the connecting member 30 is a flat panel.

Also, the connecting member 30 is constructed by more than one piece.

Besides, after the vertical strips 40 are inserted, the sealing covers are lockable by a respective screw.

Figure 4:
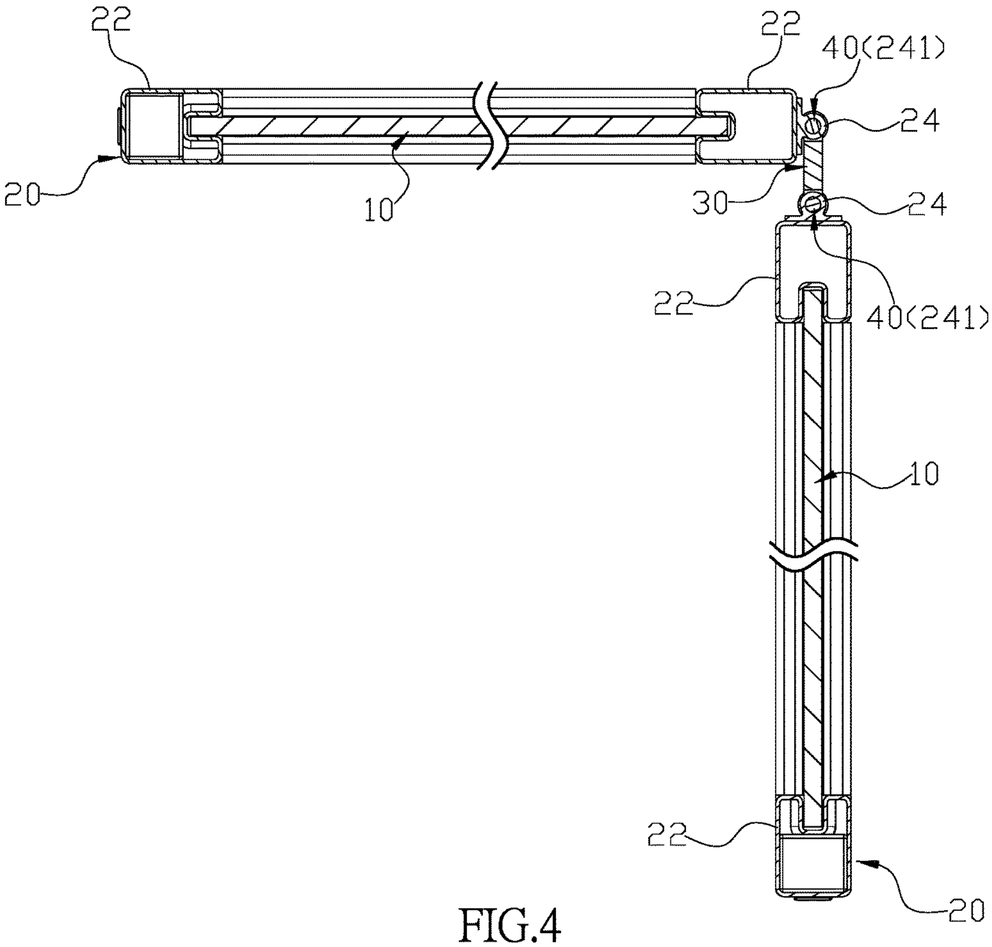
FIG. 4 is an expanded state diagram of the preferred embodiment according to the present invention.
Figure 5:
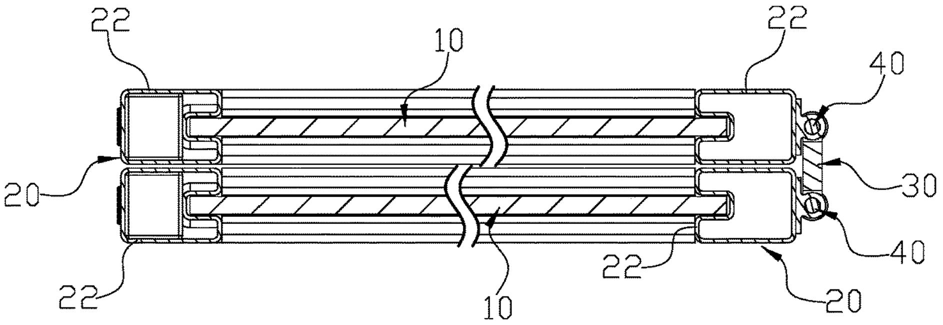
FIG. 5 is a folded schematic diagram of the preferred embodiment according to the present invention.

In actual use, the connecting member 30 is used to connect the two adjacent screen panels 10, so that the screen can be expanded in all directions as shown in FIG. 5 or folded as shown in FIG. 4. Also, the screen panels 10 can have be opened in different angles as shown in FIG. 6 and FIG. 7, so that the use of the screen can be more tailored to people and local conditions. The connecting member 30 is also used to pivotally connect the two adjacent screen panels 10, therefore, there is no need to provide a gap between the two screen panels 10 to prevent fingers from being pinched.

Although the present invention has been explained in relation to its preferred embodiment, it is to be understood that many other possible modifications and variations can be made without departing from the spirit and scope of invention as hereinafter claimed.

What is claimed is:

1. A folding dividing screen structure comprising:

at least two screen panels, a plurality of sealing covers, at least two connecting members, each connecting member having a respective vertical through channel on opposite sides of the connecting member and a protruding member on at least one of two opposite ends of the connecting member defining a respective gap on opposite sides of the protruding member, the connecting members vertically aligned each other, and at least two vertical strips, wherein:

each screen panel is secured in an outer frame, the connecting members are pivotally connected with the two screen panels via the two vertical strips, each outer frame has four edge strips connected by the sealing covers, each outer frame respectively having a vertical contacting surface formed by one of the edge strips and the sealing covers at opposite ends of the one of the edge strips, each vertical contacting surface having an engaging member disposed on the vertical contacting surface and in the gaps at a location between adjacent pairs of connecting members, and having a respective engaging member disposed adjacent to the sealing covers at opposite ends of the vertical contacting surface in the gaps defined by protruding members adjacent to the sealing covers, each engaging member having a through aperture, and the connecting members are disposed between the two screen panels, and each of the vertical strips is inserted through a respective one of the two through channels at opposite sides of each of the connecting members, and through the through apertures of the engaging members along a respective one of the vertical contacting surfaces;

therefore the two screen panels are respectively independently pivoted with two opposite sides of the connecting members, each screen panel capable of independently pivoting 180 degrees with respect to the other of the two screen panels, and the at least two connecting members are coupled to each other by the vertical strips passing through the engaging members disposed in the gaps between adjacent pairs of connecting members.

2. The folding dividing screen structure as claimed in claim 1, wherein each screen panel comprises two vertical contacting surfaces, wherein only one of the two vertical contacting surfaces of each screen panel has the engaging members.

3. The folding dividing screen structure as claimed in claim 1, wherein at least one of the screen panels comprises two vertical contacting surfaces and both of the two vertical contacting surfaces of the at least one of the screen panels has the engaging members, and the at least one of the screen panels is pivoted with another screen panel at each opposite side.

4. The folding dividing screen structure as claimed in claim 1, wherein the sealing covers are employed at a top corner of each outer frame.

5. The folding dividing screen structure as claimed in claim 1, wherein both a top corner and a bottom corner of each outer frame employ sealing covers for connecting the edge strips.

6. The folding dividing screen structure as claimed in claim 1, wherein each sealing cover is integrally made with a respective engaging member.

7. The folding dividing screen structure as claimed in claim 1, wherein each engaging member disposed on a sealing cover is installed on the sealing cover.

8. The folding dividing screen structure as claimed in claim 1, wherein the connecting member is a flat panel.

9. The folding dividing screen structure as claimed in claim 1, wherein the connecting member is constructed by more than one piece.

10. The folding dividing screen structure as claimed in claim 1, wherein after the vertical strips are inserted, the sealing covers are lockable by a respective screw.

* * * * *